United States Patent Office.

RICHARD C. REMMEY, OF PHILADELPHIA, PENNSYLVANIA.

Letters Patent No. 85,766, dated January 12, 1869.

IMPROVEMENT IN THE MANUFACTURE OF STONE-WARE FOR THE USE OF CHEMISTS AND OTHERS.

The Schedule referred to in these Letters Patent and making part of the same.

To all whom it may concern:

Be it known that I, RICHARD C. REMMEY, of Philadelphia, county of Philadelphia, and State of Pennsylvania, have invented a new and improved Composition for the Manufacture of Chemical Stone-Ware; and I do hereby declare that the following is a full, clear, and exact description of the ingredients and the proportions used in preparing the same.

The object of my invention is to make, by combining the ingredients herein set forth, a composition for the manufacture of chemical stone-ware.

The advantages of ware made from this composition consist in being impenetrable by acids, and will stand all changes of temperature without cracking or peeling.

To enable those skilled in the art to make and use my invention, I will now proceed to describe its composition.

Take, of Delaware blue clay, powdered, one hundred and twenty-five pounds.

Take, of common yellow clay, powdered, one hundred pounds.

Take, of tough loam, powdered, one hundred pounds.

Take, of Connecticut brown-stone, powdered, thirty pounds.

Take, of the flour-of-mica sand, sixty pounds.

The above ingredients are thoroughly mixed, and sufficient water added to give the composition the consistency of dough.

I do not wish to limit myself to the exact proportions set forth, as more or less of each article may be used.

Having thus described my invention,

What I claim, and desire to secure by Letters Patent of the United States, is—

A composition for the manufacture of chemical stone-ware, composed of the ingredients herein set forth, in or about the proportions aforesaid.

In testimony whereof, I have hereunto signed my name, in the presence of two subscribing witnesses.

RICHARD C. REMMEY.

Witnesses:
CHARLES H. EVANS,
HENRY ROELLIG.